(12) United States Patent
Nikitin (10) Patent No.: US 8,267,520 B2
(45) Date of Patent: Sep. 18, 2012

(54) METHOD FOR AERIAL DISPLAY OF IMAGES

(75) Inventor: Alexei V. Nikitin, Lawrence, KS (US)

(73) Assignee: Avatekh, Inc., Lawrence, KS (US)

( * ) Notice: Subject to any disclaimer, the term of this patent is extended or adjusted under 35 U.S.C. 154(b) by 436 days.

(21) Appl. No.: 11/366,949

(22) Filed: Mar. 2, 2006

(65) Prior Publication Data

US 2007/0242227 A1    Oct. 18, 2007

Related U.S. Application Data (60) Provisional application No. 60/357,891, filed on Mar. 2, 2005, provisional application No. 60/690,108, filed on Jun. 13, 2005, provisional application No. 60/727,920, filed on Oct. 18, 2005.

(51) Int. Cl.
*G03B 21/00* (2006.01)
*G03B 21/26* (2006.01)
*G03B 21/28* (2006.01)
*G03B 35/00* (2006.01)
*G03B 21/60* (2006.01)
*G03B 27/22* (2006.01)
*H04N 13/04* (2006.01)

(52) U.S. Cl. .............. 353/7; 353/121; 353/10; 353/37; 348/51; 352/57; 359/458; 359/462

(58) Field of Classification Search .............. 353/7, 6, 353/121, 10, 37, 38; 348/42, 51; 352/57, 352/239; 359/376, 458, 462
See application file for complete search history.

(56) References Cited

U.S. PATENT DOCUMENTS

| | | | |
|---|---|---|---|
| 5,621,572 A * | 4/1997 | Fergason | 359/630 |
| 6,809,891 B1 * | 10/2004 | Kerr et al. | 359/797 |
| 2002/0051118 A1 * | 5/2002 | Takagi et al. | 351/211 |
| 2002/0126396 A1 * | 9/2002 | Dolgoff | 359/743 |
| 2003/0002168 A1 * | 1/2003 | Richfield et al. | 359/634 |

* cited by examiner

*Primary Examiner* — Georgia Y Epps
*Assistant Examiner* — Magda Cruz
(74) *Attorney, Agent, or Firm* — Erickson Kernell Derusseau & Kleypas, LLC (57) ABSTRACT

The present invention relates generally to optical imaging and specifically to methods and systems for generating observable real images. The method consists of steps in configuring an image source and optical components, and defining the position of an observer in such a way that a binocular observation leads to a perception of a three-dimensional object being located in front of a background, and/or "hanging in mid-air" in front of an apparatus designed in accordance with the present invention. Particular embodiments of the invention may include various apparatus for implementing the method.

8 Claims, 8 Drawing Sheets

METHOD FOR AERIAL DISPLAY OF IMAGES

This non-provisional application claims the benefit of U.S. Provisional Patent Applications No. 60/357,891 (filed on Mar. 2, 2005) and No. 60/690,108 (filed on Jun. 13, 2005), both entitled "Method for projecting real images" and No. 60/727,920 (filed on Oct. 18, 2005) entitled "Method for displaying real images", which are incorporated herein by reference in their entirety.

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to optical imaging and specifically to methods and systems for generating observable aerial images.

BACKGROUND ART

Aerial image projection systems are known in the art. Such systems utilize a plurality of optical elements such as mirrors, Fresnel lenses, beamsplitters, light valves, and optical filters and/or polarizers to project an image of an object into space. The optical elements and the object are positioned in a housing to define an optical path. Depending on the arrangement and selection of the optical elements, the projected image is visible either within the dimensions of the housing or some distance in front of the housing. Examples of aerial projection systems include U.S. Pat. No. 6,817,716, issued Nov. 16, 2004, U.S. Pat. No. 6,808,268, issued Oct. 26, 2004, U.S. Pat. No. 6,568,818, issued May 27, 2003, U.S. Pat. No. 5,311,357, issued May 10, 1994, U.S. Pat. No. 5,552,934, issued Sep. 3, 1996, U.S. Pat. No. 4,802,750, issued Feb. 7, 1989, and U.S. Pat. Des. No. 435,043 issued Dec. 12, 2000.

Typical limitations of the methods and systems of the prior art include high cost of the optical components, heavy weight, high requirements for precision alignment and to the optical quality of the components, usage of three-dimensional objects rather than video displays as the source of the image, and various quality problems such as undesirable reflections and the visibility of the display boundaries. In addition, many prior art systems might be a source of potential fire and/or eye damage hazard due to ambient sunlight, since both the source (object or screen) and the projected image may be close to focal surfaces of the mirrors and other light focusing elements, and the focal surfaces of the components and the system as a whole may come in close contact with the housing.

BRIEF SUMMARY OF THE INVENTION

While featuring a variety of specific embodiments/apparatus for producing visually captivating aerial images, the prior art does not teach a general method for displaying three-dimensional real images by simple, lightweight and inexpensive means.

The present invention relates generally to optical imaging and specifically to methods and systems for generating observable aerial images. The method consists of steps in configuring an image source and optical components and defining the position of an observer in such a way that a binocular observation leads to a perception of a three-dimensional object being located in front of a background, and/or "hanging in mid-air" in front of an apparatus designed in accordance with the present invention. Particular embodiments of the invention may include various apparatus for implementing the method, which are generally simple, lightweight and inexpensive.

The present invention includes a method of generating a 3D optical effect by providing an imager and a source consisting of a background-source (or canvas-source) and an object-source, and configuring these elements with a binocular human observer so that the observer perceives the image of the object-source (object-image) to be closer to the observer than the image of the background (canvas-image). The configuration of elements is designed so that the outer edges of the canvas-image are invisible to the observer. The present invention overcomes the shortcomings of the prior art by providing a number of competitive advantages with respect to other known systems, including, but not limited to:

1. Low cost of optical components, and simplicity and low cost of design and manufacturing
2. Versatility and ease of reconfiguring the design to address various uses and specifications
3. High quality of the projected image (low optical distortions), even when using large viewing apertures
4. No fire and/or eye damage hazards due to sunlight, since the focal surfaces of the systems designed in accordance with the present invention do not need to come close to absorbing materials and/or extend outside of the housing unit Further scope of the applicability of the invention will be clarified through the detailed description given hereinafter. It should be understood, however, that the specific examples, while indicating preferred embodiments of the invention, are presented for illustration only. Various changes and modifications within the spirit and scope of the invention should become apparent to those skilled in the art from this detailed description. Furthermore, all the examples of hardware implementations are used only as a descriptive language to convey the inventive ideas clearly, and are not limitative of the claimed invention.

DETAILED DESCRIPTION OF THE INVENTION

Figure 1:
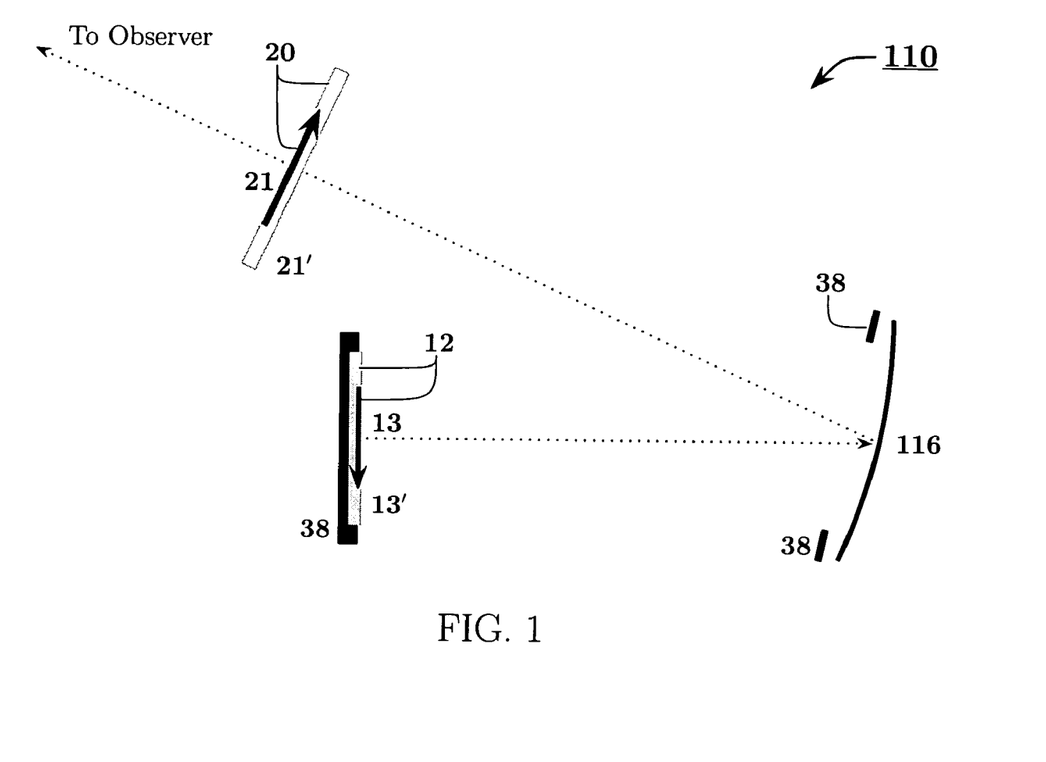
FIG. 1 is a schematic representation of one embodiment of a system designed in accordance with the present invention.

FIG. 1 shows an example (an idealized schematic) of a system 110 designed in accordance with the present invention and intended, in particular, for gaming and entertainment applications, including handheld gaming. A source 12 includes an object-source 13 super-imposed on a canvas-source (or background-source) 13', and can be, for example, a video display (screen). An imager 116 forms an image 20, including an object-image 21 and a canvas-image 21'. In the example depicted in FIG. 1, imager is a concave reflecting surface (such as a concave mirror) capable of forming an image 20 of source 12. Imager 116 and source 12 are positioned in such a way that for a properly located binocular observer (not shown) object-image 21 is completely visible while, in general, the perimeter (boundary) of canvas-source 13' is invisible to the observer. (See discussion of FIGS. 2 and 3 below.) Thus an aerial effect is being archived, where a binocular viewer perceives object-image 21 as "hanging in mid-air" spatially closer than canvas-image 21'. Optional elements of enclosure 38, such as forming an aperture or opening, can be used to interfere with the passage of the light rays and/or limit the amount of light passing through imager 116 in order to modify the desired imaging effect.

Terms and Definitions

For convenience, the essential terms used in the subsequent detailed description of the invention are provided below. These terms are listed along with their definitions adopted for the purpose of this disclosure. Examples clarifying and illustrating the meaning of the definitions are also provided.

In the present invention, an OBJECT-SOURCE is typically a depiction (still or animated) of an object in a two-dimensional (flat or curved) surface. For genuine 3D perception, an object-source needs to realistically depict a three-dimensional object in a two-dimensional canvas. For example, such an object-source can be a perspective drawing. An object-source can also be a physical object such as a statuette or an action figure, or a still or animated one- or multi-channel holographic image.

A SOURCE is an OBJECT-SOURCE depicted or super-imposed on/over a CANVAS-SOURCE.

A CANVAS-SOURCE is a background of the source (for example, uniform/solid background, or background scene rendered to appear sufficiently behind the object-source). The canvas-source can be a part of the surface in which the object-source is depicted. In this case, the canvas-source completely includes/surrounds the object-source and either has uniform/solid color or depicts a background scene rendered to appear sufficiently behind the object-source. The canvas-source can also be spatially separated from the object-source.

An IMAGER is a device by means of which light rays are reflected and/or refracted so that they converge or diverge to form an image. For example, an IMAGER can be a refractive lens or a concave or convex spherical or parabolic mirror. An IMAGER can be a combination of two or more such devices, sometimes with other optical devices such as prisms and/or planar mirrors, configured to form an image. In the present invention, an IMAGER may include other components such as structural/support components and apertures that interfere with the passage of the light rays and/or limit the amount of light passing through an IMAGER.

Figure 2A:
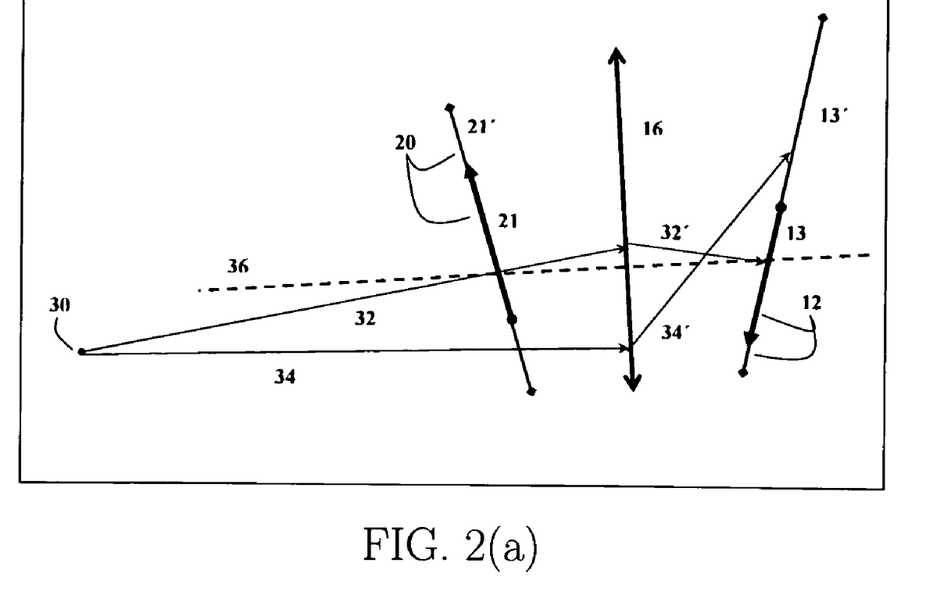
FIG. 2(a) illustrates the definition of a complete field of view for the present invention wherein an object-source and a canvas-source are spatially aligned.
Figure 2B:
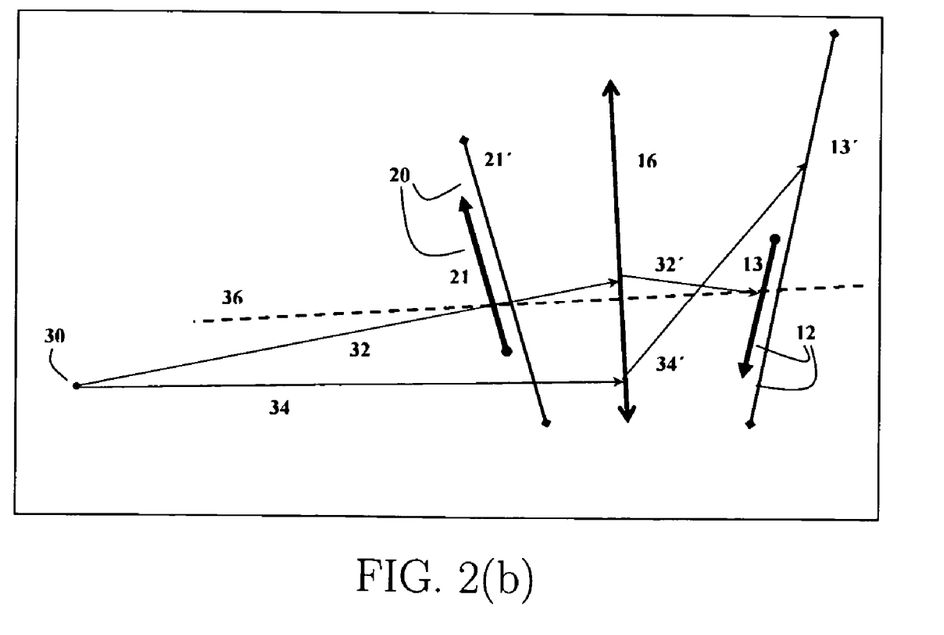
FIG. 2(b) illustrates the definition of a complete field of view for the present invention wherein an object-source and a canvas-source are spatially separated.

An IMAGE is the image of the source formed by the imager. An OBJECT-IMAGE and a CANVAS-IMAGE are the images of the object-source and the canvas-source, respectively. A COMPLETE FIELD OF VIEW can be defined as a region in the space that simultaneously satisfies the following criteria I and II (see FIG. 2):

I. For any point in the complete field of view a light ray originating at that point AND intersecting the object-image will pass through the imager and reach the object-source.

II. For any point in the complete field of view a light ray originating at that point AND passing through the imager will reach the source.

Note that, according to the above definition, if an observation is made from a point in the complete field of view then the object-image is completely visible to an observer while the perimeter (boundary) of the canvas-source is invisible to the observer.

FIG. 2(a) illustrates the definition of a complete field of view generically for any system in accordance with the invention, by showing source 12, object-source 13, canvas-source 13', imager (thin lens) 16, image 20, object-image 21, canvas-image 21', a point 30 in the complete field of view, the light rays 32/32' & 34/34' from point 30 in a complete field of view, and the optical (principal) axis of the lens 36. FIG. 2(b) gives the same illustration as FIG. 2(a), but with object-source 13 and canvas-source 13', and, as a consequence, object-image 21 and canvas-image 21' spatially separated.

When an eye of an observer is within the complete field of view, an object-image is completely visible and is surrounded by the canvas-image. On the other hand, the visibility of the canvas-image is limited by the visible aperture of the imager so that the boundaries of the canvas-image are not observed. Since, in general, the object-image is located/formed on a surface spatially separated from the aperture of the imager, a change in observational position that provides a new line of sight causes a change in the visible position of the object-image in relation to the aperture. For a uniform/solid background/canvas, this leads to a relative change in the visible position of the object on the canvas. When the image of the source is located/formed between the observer and the imager, a binocular observation (from within the complete field of view) leads to a perception of the object-image being located "in front of" the imager. Since the imager is located within the physical embodiment of an apparatus (enclosure), a binocular observation leads to a perception of a picture "hanging in mid-air" in front of the apparatus (or outside of the enclosure). If an object-source realistically depicts a three-dimensional object (for example, the object-source is a perspective drawing), the object-image is perceived as a solid 3D object hanging in mid-air (outside of the enclosure).

Figure 3:
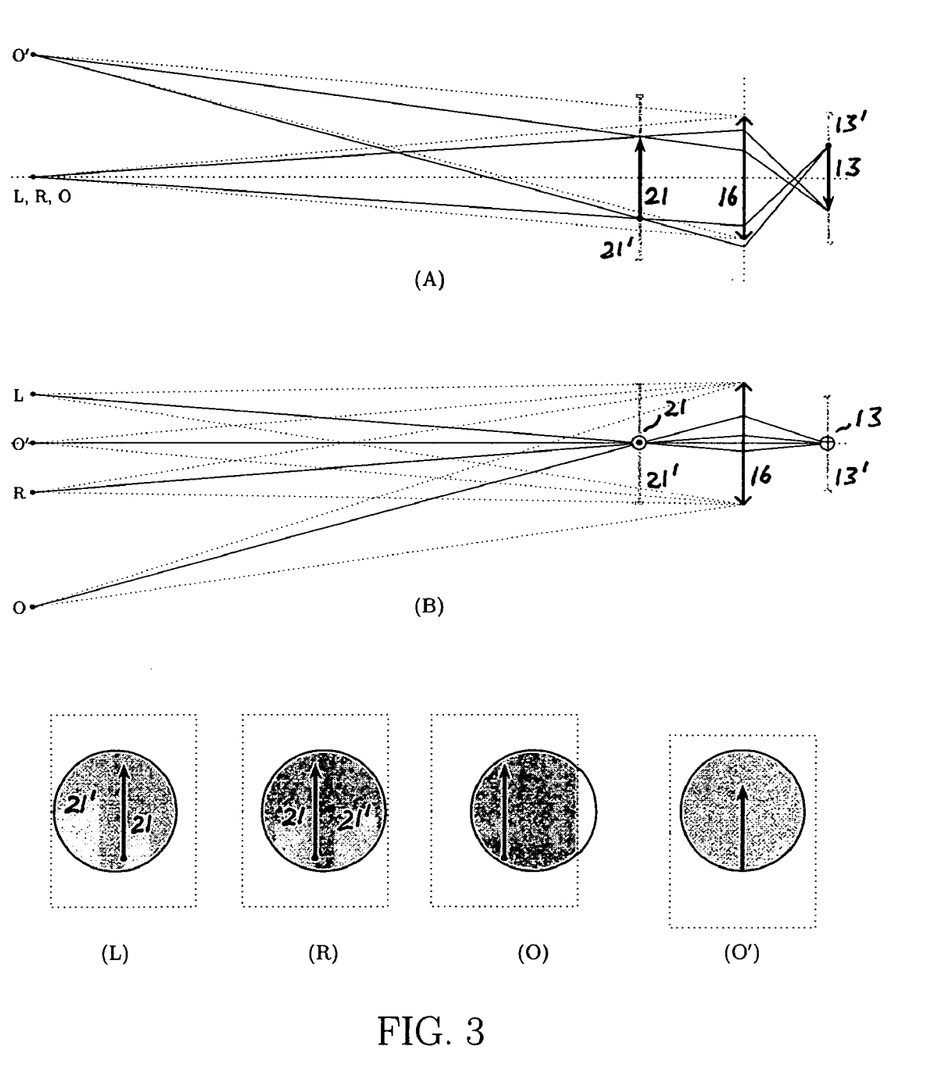
FIG. 3 is a schematic representation of the present invention along with illustration of several views from different observation points.

This is illustrated in FIG. 3, which shows a schematic representation of a simple system in accordance with the present invention along with several views from different observation points. FIGS. 3(A) and 3(B) show side and top view, respectively, of the system and the location of the observation points. Imager 16 (a circular thin lens) generates object-image, 21 from object-source 13 (a black arrow), and canvas-image 21' from canvas-source 13' (a gray rectangular). FIGS. 3(L) and 3(R), respectively, show the observations made from points L and R in a complete field of view. One can see that the lens forms a circular gray background, and its visible location coincides with the location of the lens. The location of the arrow with respect to that background is different for observations made from points L and R, and thus a binocular observation will lead to perception of the arrow being located in front of the lens. FIGS. 3(O) and 3(O'), respectively, show the observations made from points O and O' outside of the complete field of view. Observations made from such points will undermine a proper 3D perception.

Figure 4:
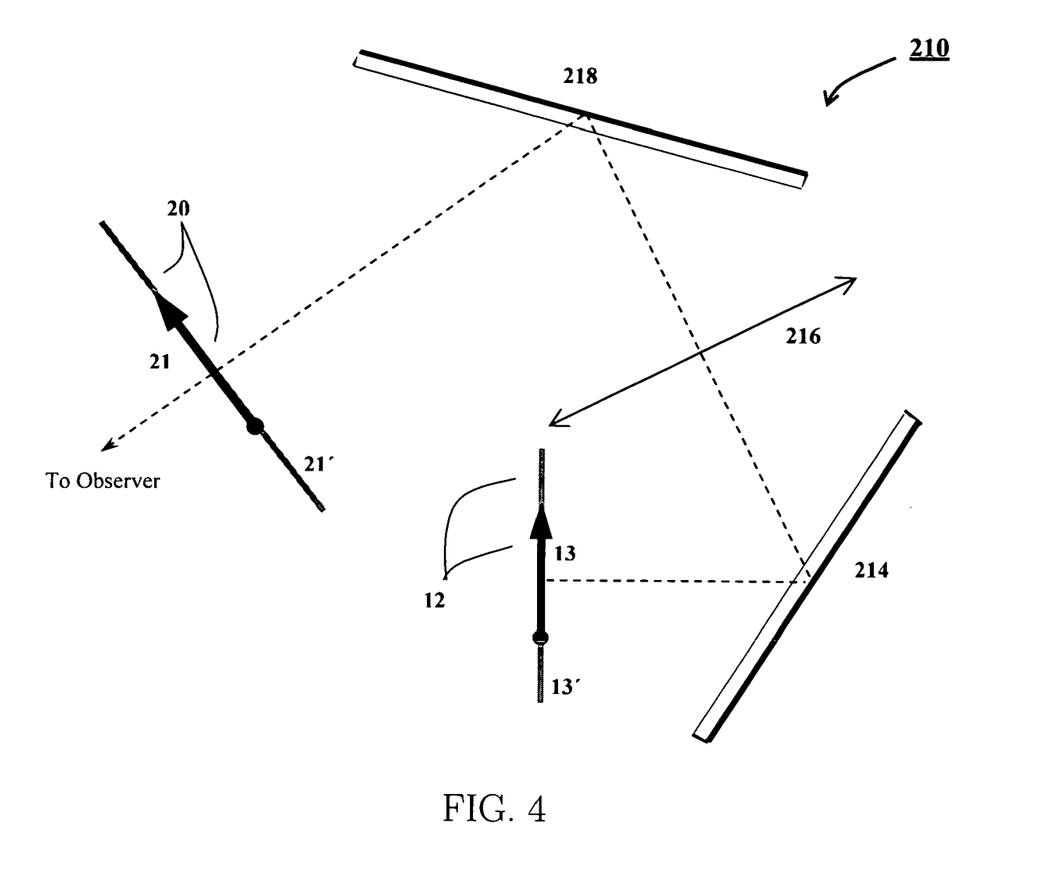
FIG. 4 is a schematic representation of another embodiment of the system in accordance with the present invention where an imager consists of a refractive (Fresnel) lens and two planar mirrors.
Figure 5:
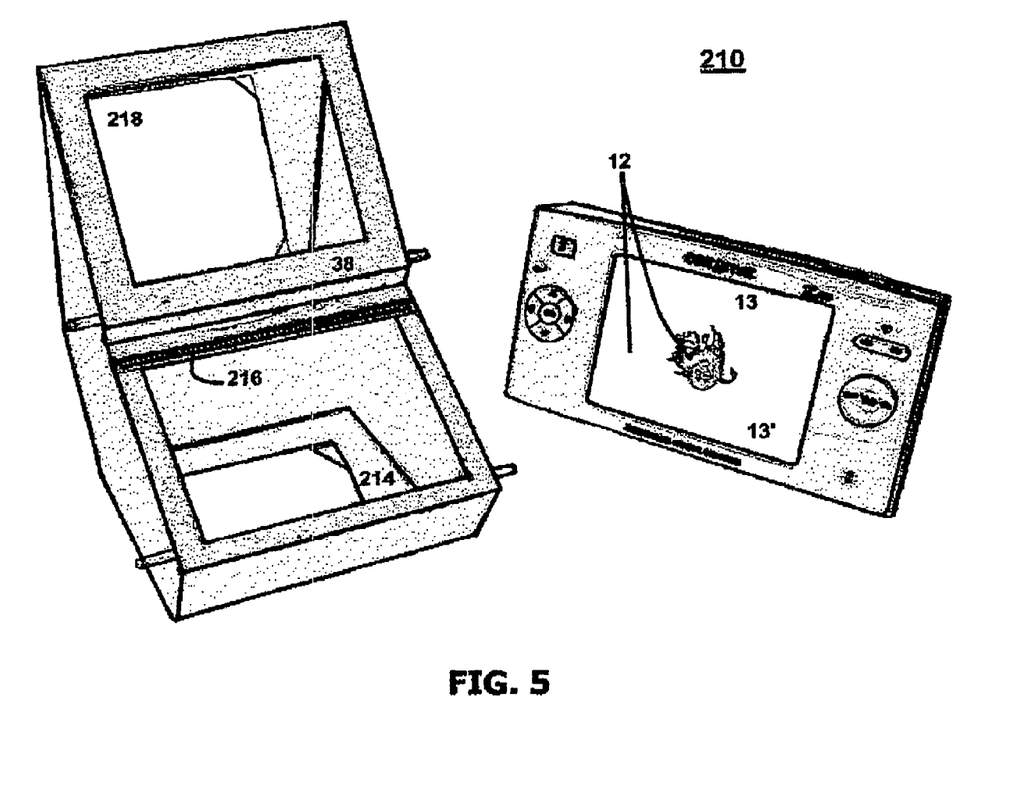
FIG. 5 realistically depicts the components of the system of FIG. 4.
Figure 6:
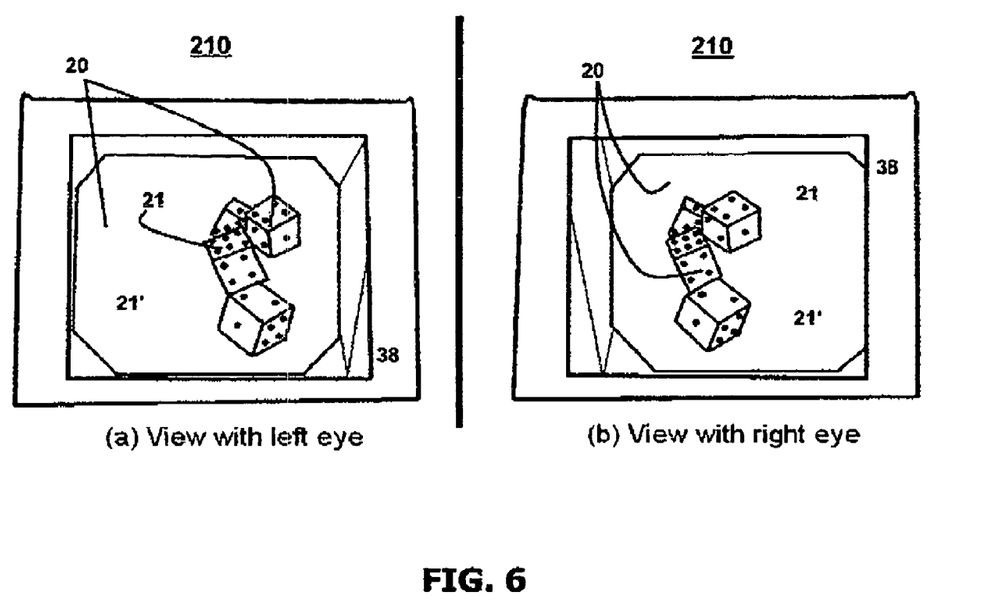
FIG. 6(a) is a left-eye view of the image formed by the system of FIG. 4.
FIG. 6(b) is a right-eye view of the image formed by the system of FIG. 4.

FIG. 4 depicts a schematic representation of a system 210 in accordance with the present invention where an imager consists of a refractive (Fresnel) lens 216 and two planar mirrors 214 and 218, and FIG. 5 is a photograph of the components of the system 210 of FIG. 4, with the source (video display) detached. FIG. 6(a) shows a left-eye view of the image formed by the system shown in FIGS. 4 and 5, and FIG. 6(b) shows a right-eye view of the image. One can see that the object-image (21) changes its position relative to the visible background (21').

Figure 7:
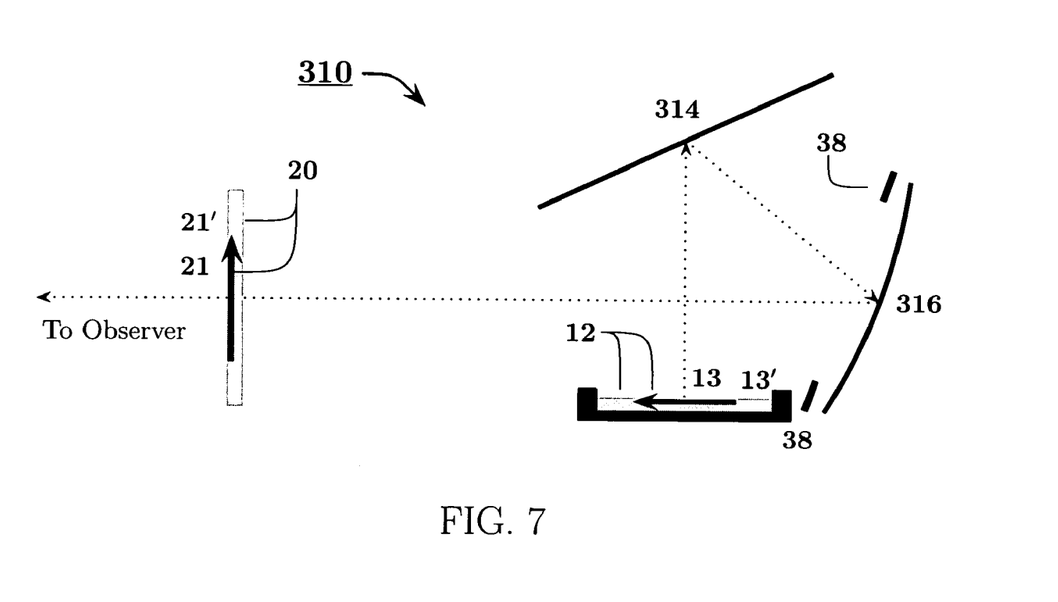
FIG. 7 is a schematic representation of yet another embodiment of the system in accordance with the present invention where the imager consists of a concave mirror and a planar mirror.
Figure 8:
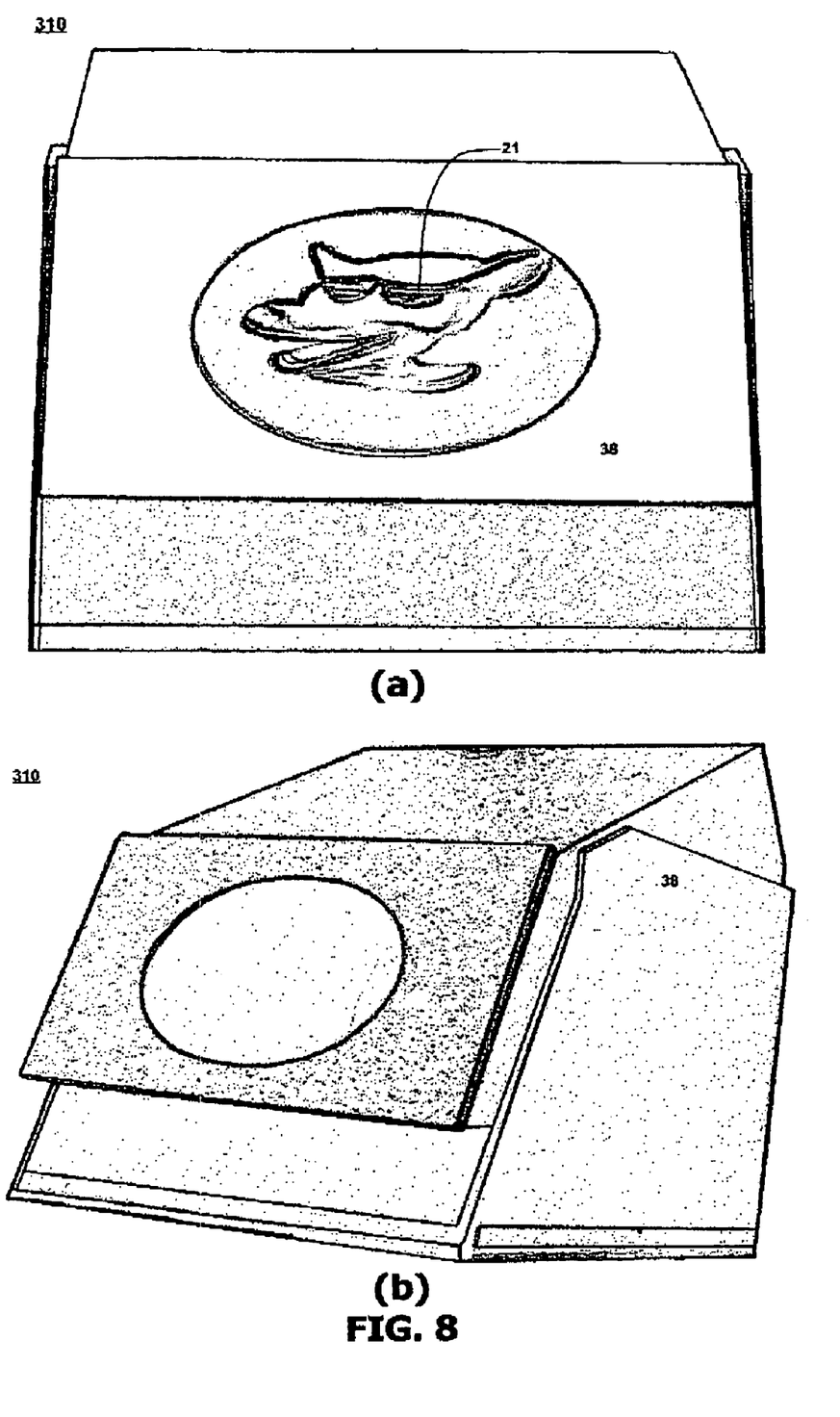
FIG. 8(a) depicts the system of FIG. 7 generating an aerial image.
FIG. 8(b) shows the system of FIG. 7 viewed from outside of the complete field of view.

FIG. 7 depicts a schematic representation of a system 310 in accordance with the present invention where an imager consists of a concave reflected surface (concave mirror) 316 and a planar mirror 314, and FIG. 8 is a photograph showing a working prototype of the system 310 of FIG. 7. System 310 is mounted inside of enclosure 38.

It should be understood that the invention is not limited to the described embodiments particularly described herein. Rather, further alternatives can be employed in practicing the present invention. It is intended that the following claims define the scope of the present invention and that structures and methods within the scope of these claims and their equivalents be covered thereby.

What is claimed is:

1. A method of generating a three-dimensional aerial optical effect comprising:
   providing a single source for generating an image wherein said single source is depicted on a two-dimensional surface and has an outer boundary, and includes an object-source and a canvas-source, and wherein said object-source is generally centered on said two-dimensional surface within said outer boundary and wherein said canvas-source completely surrounds said object-source and has an outer boundary common to said outer boundary of said single source;
   providing an imager suitable for forming a two-dimensional image of said single source visible to a binocular human observer, including an object-image and a canvas-image, wherein said object-image and said canvas-image are formed on the same two-dimensional surface; and
   positioning said single source, said imager, and said binocular human observer such that said object-image is fully visible to said binocular human observer while said canvas-image is only partially visible to said binocular human observer, wherein said outer boundary of said canvas-source is obscured from said binocular human observer, and wherein said binocular human observer perceives said object-image as being closer than said canvas-image.

2. The method of claim 1 wherein visibility of said outer boundary of said two-dimensional image of said single source is determined by an aperture of said imager and wherein said two-dimensional image of said single source is formed between said binocular human observer and said aperture.

3. The method of claim 1 wherein the step of providing said imager is performed by providing one or more elements comprising:
   a refractive element and a reflective element.

4. The method of claim 3 wherein visibility of said outer boundary of said two-dimensional image of said single source is determined by art aperture of said imager and wherein said two-dimensional image of said single source is formed between said binocular human observer and said aperture.

5. An apparatus for generating a three-dimensional aerial optical effect, adapted for viewing by a binocular human observer, comprising:
   a single source suitable for generating an image wherein said single source is depicted on a two-dimensional surface and has an outer boundary, and includes an object-source and a canvas-source, wherein said object-source is generally centered on said two-dimensional surface within said outer boundary and wherein said canvas-source completely surrounds said object-source and has an outer boundary common to said outer boundary of said single source;
   an imager operatively associated with said single source and suitable for forming a two-dimensional image of said single source visible to said binocular human observer, including an object-image and a canvas-image, wherein said object-image and said canvas-image are formed on the same two-dimensional surface; and
   wherein said two-dimensional image of said single source is formed by said imager, and said binocular human observer is appropriately positioned in the field of view, and said object-image is fully visible to said binocular human observer, and said canvas-image is only partially visible to said binocular human observer as said outer boundary of said canvas-source is obscured from said binocular human observer, and wherein said binocular human observer perceives said object-image as being closer than said canvas-image.

6. The method of claim 5 further comprising:
   an enclosure containing said imager and having an aperture;
   wherein visibility of said outer boundary of said two-dimensional image of said single source is determined by an aperture of said imager and wherein said two-dimensional image of said single source is formed between said binocular human observer and said aperture.

7. The method of claim 5 wherein said imager comprises of one or more elements selected from the group consisting of a refractive element and a reflective element.

8. The method of claim 7 further comprising:
   an enclosure containing said imager and having an aperture;
   wherein visibility of said outer boundary of said two-dimensional image of said single source is determined by an aperture of said imager and wherein said two-dimensional image of said single source is formed between said binocular human observer and said aperture.

* * * * *

UNITED STATES PATENT AND TRADEMARK OFFICE
CERTIFICATE OF CORRECTION

| | | |
|---|---|---|
| PATENT NO. | : 8,267,520 B2 | Page 1 of 1 |
| APPLICATION NO. | : 11/366949 | |
| DATED | : September 18, 2012 | |
| INVENTOR(S) | : Alexei V. Nikitin | |

It is certified that error appears in the above-identified patent and that said Letters Patent is hereby corrected as shown below:

Column 6, line 10, delete "art" and substitute --an--.

Signed and Sealed this
Thirteenth Day of November, 2012

David J. Kappos
*Director of the United States Patent and Trademark Office*